United States Patent
Kapadia et al.

(10) Patent No.: US 9,916,461 B2
(45) Date of Patent: Mar. 13, 2018

(54) IDENTITY CONTEXT-BASED ACCESS CONTROL

(75) Inventors: Kaushal Kiran Kapadia, Pune (IN); Rahul Prabhakar Kulkarni, Pune (IN); Nataraj Nagaratnam, Cary, NC (US); Anindya Neogi, New Delhi (IN); Magesh Rajamani, Pune (IN)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 13/608,125

(22) Filed: Sep. 10, 2012

(65) Prior Publication Data
US 2014/0075492 A1    Mar. 13, 2014

(51) Int. Cl.
G06F 17/00    (2006.01)
H04L 29/06    (2006.01)
G06F 21/60    (2013.01)

(52) U.S. Cl.
CPC .......... *G06F 21/604* (2013.01); *H04L 63/102* (2013.01)

(58) Field of Classification Search
CPC ....... H04L 63/08; H04L 63/102; H04L 63/10; G06F 21/6218
USPC .......................................................... 726/1
See application file for complete search history.

(56) References Cited

U.S. PATENT DOCUMENTS

| | | | |
|---|---|---|---|
| 2002/0144142 A1 | 10/2002 | Shohat | |
| 2005/0021977 A1 | 1/2005 | Oberst | |
| 2008/0288330 A1* | 11/2008 | Hildebrand | G06Q 10/06 705/7.28 |
| 2009/0300002 A1* | 12/2009 | Thomas | G06F 17/30522 |

FOREIGN PATENT DOCUMENTS

CN    101729403 A    6/2010

* cited by examiner

*Primary Examiner* — Evans Desrosiers
(74) *Attorney, Agent, or Firm* — Jeffrey S. LaBaw; David H. Judson

(57) ABSTRACT

Identity context-based access control is implemented by generating an identity context expression from user identity data. In particular, users are clustered based on combinations of one or more attributes. These clusters comprise one or more identity context(s). Preferably, an intersection of attribute sets of each user in the cluster is formed. In addition, an intersection of attribute sets of each user not in the cluster also is formed. If the attribute set that is common across the cluster of users is not a subset of the attribute set that is common across the rest of the users, then the attribute set forms a unique identity context expression. To reduce the number of roles used in role-based access control (RBAC), at least one role is replaced with an identity context expression. Run-time access control is then enabled.

22 Claims, 3 Drawing Sheets

| Users | Attributes |
|---|---|
| u1 | a1,a2,a5 |
| u2 | a1,a2 |
| u3 | a1,a2,a5 |
| u4 | a1,a2 |
| u5 | a1,a2 |
| u6 | a2,a3,a4 |
| u7 | a2,a3,a4 |
| | |

A1 -> {u1,u2,u3,u4,u5}
A2 -> {u1,u2,u3,u4,u5,u6,u7}
A3 -> {u6,u7}
A4 -> {u6,u7}
A5 -> {u1,u3}
A1,A2 -> {u1,u2,u3,u4,u5}
A2,A3 -> {u6,u7}
A2,A4 -> {u6,u7}
A3,A4 -> {u6,u7}
A2,A3,A4 -> {u6,u7}
A1,A2,A5 -> {u1,u3}

A3 -> {u6,u7}
A4 -> {u6,u7}
A2,A3 -> {u6,u7}
A2,A4 -> {u6,u7}
A3,A4 -> {u6,u7}
A2,A3,A4 -> {u6,u7}

IDENTITY CONTEXT-BASED ACCESS CONTROL

BACKGROUND OF THE INVENTION

Technical Field

This disclosure relates generally to security within an enterprise computing environment and, in particular, to an identity context-driven approach to control whether users are permitted access to enterprise resources.

Background of the Related Art

Identity is a very key component for defining access control policies in an organization. As numbers of users and applications grow, supporting access control systems that are based on individual identity becomes time-consuming, unwieldy and expensive. To address this problem, it is known in the art to provide role-based access control (RBAC) for enforcing security within an enterprise. In RBAC, security properties, such as access control to sensitive resources, are controlled through roles. Users are assigned one or more roles, who then inherit the security properties associated with the roles. RBAC provides greater security by preventing users from obtaining inconsistent or incompatible security properties. In this approach, a role is a set of permissions that are enabled for an organizational agent that performs certain job functions. A typical RBAC model is based on role names, and assignment of users to those roles. The associated access control is based on these roles. An RBAC-based role typically has meaning only within a given context (i.e., within a Company in which the role is defined, with respect to a given application system used in the Company, or the like).

Role engineering is the process of defining a set of roles for the organization and assigned permissions to those roles. Role engineering may be carried out in a top-down manner, or a bottom-up manner. In a top-down approach, roles are defined by analyzing business processes and identifying the one or more functions that comprise each such process; a set of permissions on information systems are then associated with each function. Typically, the top-down approach begins by defining a job function; a role is then created for this function by associating whatever permissions are needed. Role mining can be used in conjunction with this top-down approach to identify proposed roles that can be examined to determine if that satisfy the business process function to which they might be associated. In contrast, in a bottom-up approach, existing permission assignments are used to formulate roles. Typically, one or more permission assignments are aggregated and associated with a role, and the process may be automated for efficiency.

Role-based access control, while providing benefits, is not always useful because not every group of users to which a policy applies can be translated into a role. Moreover, trying to cover all of the use cases using RBAC often leads to role proliferation and increases the overhead associated with role governance. Moreover, often the definition of a role is not logical, thereby creating additional management difficulties. As an example, assume that the enterprise policies need to be applied to a group of users who are grouped based on an attribute like location, e.g., all people who site in a given city (location) are allowed to enter the office there. Defining a role such as "all people in the city" is not logical, as it is overbroad.

It would be desirable to provide enhanced access control techniques that overcome these and other problems of the prior art.

BRIEF SUMMARY

According to this disclosure, a new approach to access control is based on an "identity context" in association with a "role." As used herein, an identity context is defined by values of one or more attributes of identity data associated with a user. In this approach, identity data is used to generate an identity context in the form of an identity context expression, which expression is then used in conjunction with role-based access control to define an access control policy. At run-time, the access control policy (and, thus, the identity context) is evaluated to determine whether access should be allowed.

In one embodiment, identity context-based access control begins by generating an identity context expression from user data. In particular, users are clustered based on combinations of one or more attributes. These clusters comprise one or more identity context(s). Preferably, an intersection of attribute sets of each user in the cluster is formed. In addition, an intersection of attribute sets of each user not in the cluster also is formed. If the attribute set that is common across the cluster of users is not a subset of the attribute set that is common across the rest of the users, then the attribute set forms a unique identity context expression. To reduce the number of roles used in RBAC, at least one role is replaced with an identity context expression. Run-time access control is then enabled.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
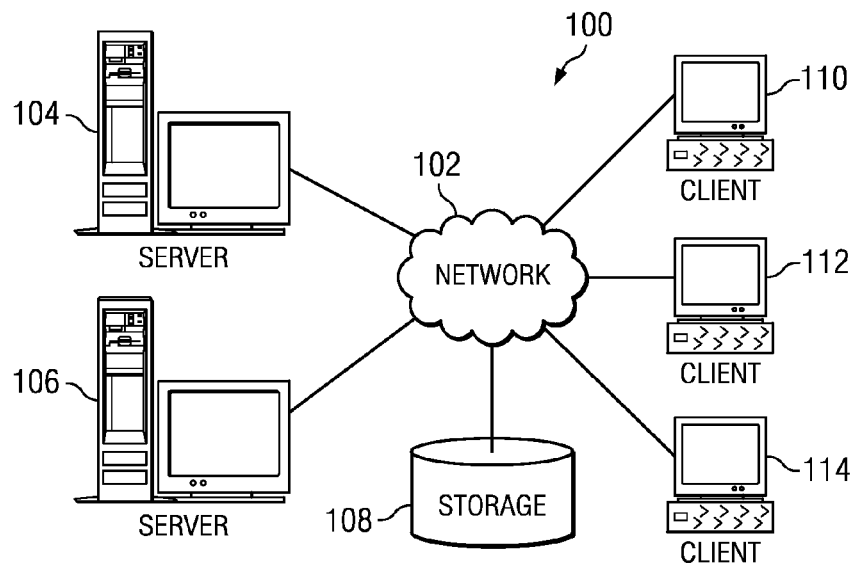
FIG. 1 depicts an exemplary block diagram of a distributed data processing environment in which exemplary aspects of the illustrative embodiments may be implemented.
Figure 2:
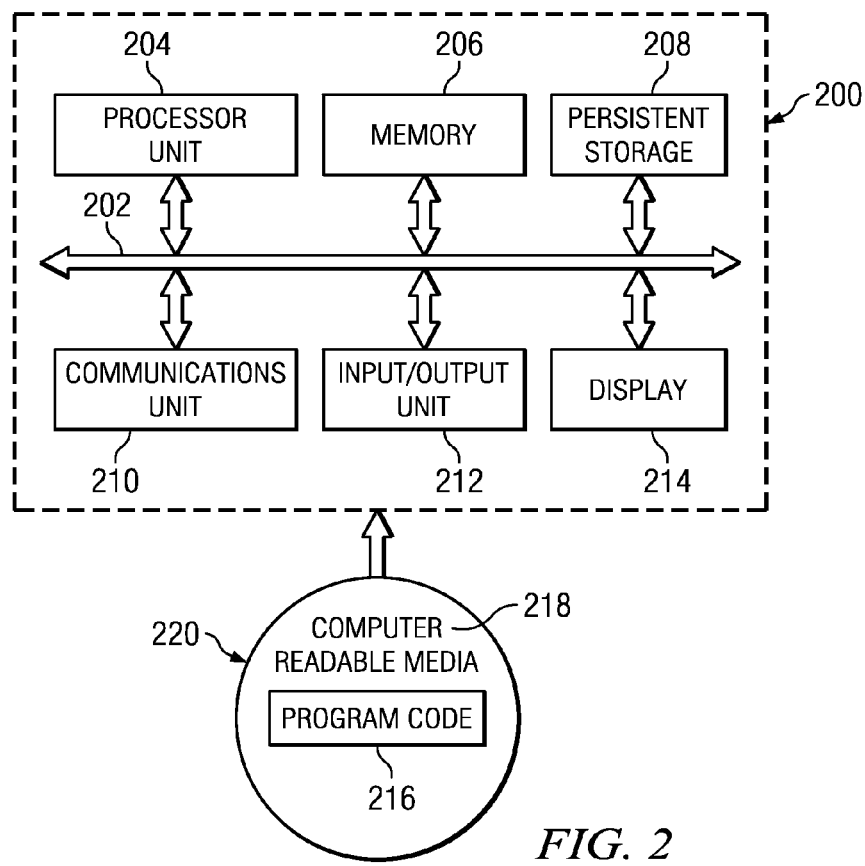
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
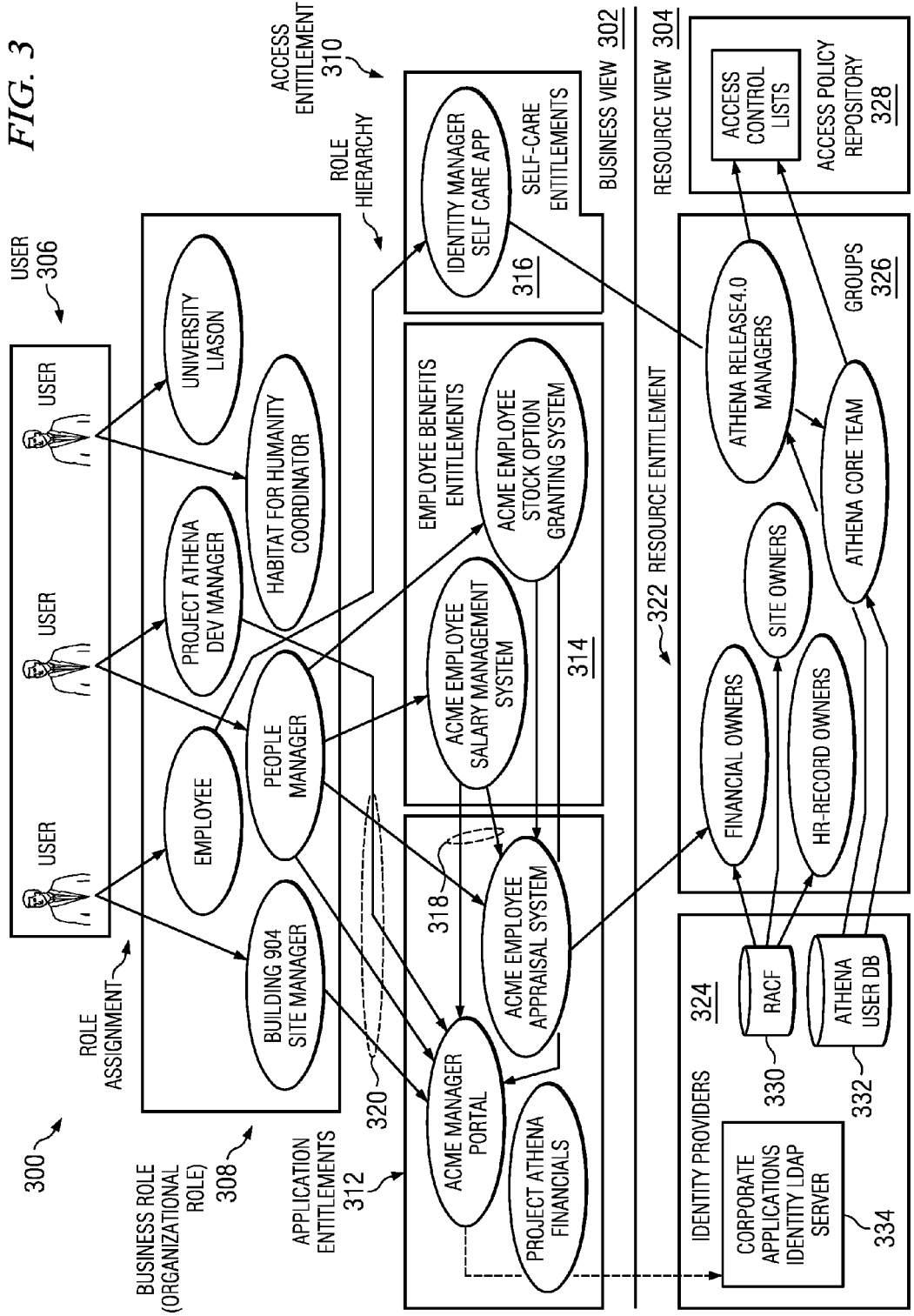
FIG. 3 is a block diagram of an exemplary business model built around an access entitlement framework and in which the disclosed technique may be implemented.

By way of further background, FIG. 3 is a block diagram of an access entitlement framework comprising an access entitlement entity model and role-based access control. The access entitlement framework is provided by an identity management system, such as, for example, IBM® Tivoli® Identity Manager (TIM). Business model 300 in FIG. 3 may be used to support logical provisioning of business applications within the context of an identity management system. In particular, business model 300 is used to abstract the concept of access entitlement to one more aligned with a business perspective. The abstraction of access entitlement from a business perspective de-couples the implementation details of the IT infrastructure to support access control and allows the same business model to be applied to different IT environments without any impact on the access privileges of the business users.

Business model 300 is shown to comprise a business view 302 and a resource view 304. A business view is the business-oriented description of the roles and access privileges so that it can be understood by business users. The roles are defined based on business related job functions for the user. The business-oriented description describes the access privileges in the context of a specific business domain, such as what an accountant can do in an accounting application. A resource view describes the details about the underlying access control system that provides a safeguard to the corresponding business applications. For example, the details may include information about the identity service provider to authenticate the subject user and provide identity and attributes for the user, information about the policy provider in which the access control policy is defined to specify user entitlements, and system specific permissions (e.g., access control lists (ACLs)).

In this illustrative example, a company, Acme Inc., employs an identity management system in its business model. Within business view 302, user attributes specific to an organizational role and access entitlement to resources are supported via role assignment, which includes assigning a user to one or more business roles in the organization. Organizational roles are used to group people according to their function in the organization. All Acme employees are granted the employee role in the organization. For example, a user 306 may be assigned to one or more organizational roles 308 in a company, such as, for example, site manager, project manager, HR manager, and the like, as well as ancillary employee roles such as university liaison or community coordinator. Assignment of a user to an organizational role enables role-based provisioning of access entitlements to managed resources. For example, services in an identity manager represent different types of managed resources, such as Oracle® databases, Windows® machines, and the like. An organizational role may be linked to services by means of provisioning policies, entitling persons in the organizational role to an account on the managed resource that is linked to that service.

In addition, one or more access entitlements may be assigned to a user or to an organizational role. Access entitlements 310 specify permissions given to a user or organizational role to access managed resources. Within the access entitlement framework, access entitlement comprises a set of attributes that describes the business perspectives of the access privilege and contains a set of resource entitlements that defines what entitles the user to have the access privilege with a specific resource infrastructure. The set of attributes that describes the access privilege may include the name of the access privilege, the access privilege type (business category), the description of the access privilege, and other access-specific custom attributes from a business perspective.

In this example, access entitlements 310 comprise application entitlements 312, employee benefits entitlements 314, and self-care entitlements 316. A user 306 or organizational role 308 may gain access to an application if the access entitlements in application entitlements 312 specify that user 306 or organizational role 308 has access privileges to the application resource. For example, all managers at Acme have access to the Acme manager portal in application entitlements 312. Only people managers may have access to application access entitlements, such as the employee salary management system or the employee stock option granting system in employee benefits entitlements 314. Role hierarchies/dependencies may be built among access entitlements (e.g., lines 318) or organizational role and access entitlement (e.g., lines 320) and be integrated into the organizational role hierarchy. Role hierarchies/dependencies specify a prerequisite for obtaining access to an application. For instance, a user may be granted access to application A only if the user also has access to application B. Thus, the user's access to application A is dependent upon also having access to application B. In this illustrative example, access entitlements to the employee salary management system or the employee stock option granting system are dependent on access entitlements to the employee appraisal system and the manager portal in application entitlements 312 being granted.

Access entitlement types include group entitlement, ad hoc rule entitlement, and composite entitlement. Group entitlement comprises access entitlements fulfilled by organizational role membership in the context of a single identity service provider. Ad hoc rule entitlement comprises access entitlements fulfilled by a Boolean rule defined on set of user attributes in the context of a single identity service provider. Composite entitlement comprises access entitlements fulfilled by multi-resource entitlements in the context of different identity service providers. A multi-resource entitlement comprises access to multiple elements. For instance, a user is granted access to application D. In this example, application D is an aggregated element which comprises applications A, B, and C. Thus, if a user requests access to application D, the user may also obtain access to applications A, B, and C when access to application D is granted.

The managed resources that an identity manager provides provisioning for are represented as services. Within resource view 304, resource entitlements 322 define the conditions in which an access entitlement, such as an entitlement in application entitlements 312, employee benefits entitlements 314, or self-care entitlements 316, may be fulfilled for a user with a specific identity provider. Identity providers 324 are authentication authorities which issue and validate user identities and access entitlements for a set of users. The business organization may act as an identity provider for users 306. Identity providers 324 use the conditions in which an access entitlement may be fulfilled to generate a Boolean rule that is used to evaluate if a specific user has the access entitlement, as well as to discover existing user entitlements. The rule may also be used to generate a set of attributes with which the rule provisions the access entitlement for a user. Resource entitlements may be managed in groups, as shown by resource entitlement groups 326. Identity providers 324 may instantiate access entitlement for a user via a set of accounts on related services. An account may contain the user identity, profile attributes, access entitlement attributes (permission attributes), and access specific attributes for the user. An administrative owner can be identified for the access entitlement so that the administrative owner may participate in any lifecycle management process related to the access entitlement, including the access request approval and access recertification process. An existing resource entitlement in the framework may be managed directly as an access entitlement, or it can bind to an abstracted access entitlement object which de-couples any specific dependencies of the framework but contains the static business description of the access privilege.

In this illustrative example, identify providers 324 include Resource Access Control Facility (RACF) 330, Athena user database 332, and corporate LDAP server 334. RACF 330 hosts identities that pertain to any financial management systems (e.g., salary, stock, financial systems). Athena user database 332 hosts identities for applications that pertain to operational systems (e.g., site maintenance applications). Corporate LDAP server 334 hosts identities for people working on the Athena project and is concerned with protecting access to the Athena project.

Modeling of the access entitlement as a manageable entity allows access entitlement to be unified into the RBAC model to support various security policies in access policy repository 328 around access entitlement. An access entitlement may be viewed as a system or application role, and may be associated with business roles. Security policies in access policy repository 328 may be used to define relationships between different organization roles 308, between an organizational role 308 and access entitlements 310, and between different access entitlements 310. Semantics supported in such relationships include inheritance, allow (privileged or granted), relationship constraints, and attribute constraints. An inheritance relationship implies that one role will automatically inherit all privileges of the other role. The privilege inheritance is automatic and enforced consistently. An allow relationship (privileged or granted) implies that membership in one role allows a user to request another role explicitly. The other role may be granted to the user upon the completion of a business workflow. Relationship constraints are a set of constraints that are defined among the different types of roles, including business roles and application roles. For example, the constraints of "separation of duty" may be defined statically or dynamically to prevent a user from having multiple roles. Attribute constraints are a set of constraints which define the user-role assignment restrictions when a role is assigned to user.

In a representative embodiment, the identity manager 302 is Tivoli Identity Manager, the access manager is Tivoli Access Manager for Enterprise Single Sign-On (TAM E-SSO), and the directory integrator is Tivoli Directory Integrator (TDI). The solution provides for automated check-out and check-in of a privileged ID within the security context of an access profile that is being managed by the access manager. In the usual operation, the check-out is an exclusive check-out of an individual privileged account for the duration of its use by that user. When an application is closed, the access manager executes a check-in of the credentials back into the identity manager.

In operation, an organization defines privileged roles that are tied to appropriate system and account entitlements. The roles can also be tied to pools of accounts (for example, a pool of 15 database administrator accounts) when more than one user is expected to use a given privilege at the same time. When those roles are assigned to an employee, the solution 300 automatically provisions any personal accounts that the user is entitled to, and it also allows that employee the option of checking-out any entitled privileged IDs for a specified lease period. The Tivoli Access Manager for Enterprise Single Sign-On client 308 is leveraged to simplify privileged account access and provide automation for the user. When a user accesses a system where a privileged ID is required, the client 308 automatically checks-out the required account and inserts the credentials into the user's session. After finishing the tasks that required using the privileged account, the user can rely on an automatic check-in process to return the privileged user ID to the stack.

An RBAC data model may be defined as follows.

An entity, like a person or organization, has one or more identities in a given context, and each identity defines a set of characteristics (defined by a set of attributes and related information) that represent various views of the entity within that context. A human being typically has many identities. Thus, for example, assume Bob Smith as a person has an identity relevant to his employer (e.g., IBM). Bob Smith as an entity has an identity (with his email as identifier—bsmith@us.ibm.com, and with attributes like level, location, and the like), and this identity is relevant to a given context (e.g., IBM Bluepages). Similarly, Bob Smith has an identity as an employee (to his employer), as a citizen (to the government), and so forth, with respect to any person, organization, group or device type. An identity thus has a set of attributes that defines the characteristics of that entity. Some of those attributes are relevant to that identity in a given context (e.g., name, account number, etc.), and some are specific to particular roles that the identity may take on in that given context. Some of these attributes may also be shared across different contexts. Thus, for example, Bob Smith may have attributes, such as email-address, phone number, passport information, fingerprint data, or the like that may be shared with others, such as his employer, port control authority, or the like. Bob Smith may have a specific attribute, such as platinumCustomer, and preferredColor, in the context of "customer" to an entity such as Clothes-R-Us. As also noted, an identity can be identified by one or more identifiers, e.g., email id, short name, etc. An identity may have multiple authenticators. A given authenticator may only validate some of the attributes and not all of them (e.g., a password is sufficient to identify a Teller role, but not Supervisor role). Some authenticators may be self-managed identifiers, assigned by a naming authority, or merely system identifiers. Among these, there may be one identifier (e.g., X.500 name) that uniquely identifies that identity in a given context. Thus, a given identity has at least one attribute that acts as an identifier. For example, Bob Smith may have a "bob" identifier in Company A's system, an identifier bsmith@us.ibm.com in his employer's system, an identifier SSN in a Government system, and so forth. Example types of relationships between identities are (a) an entity Bob Smith can have an identity bsmith (as identifier) in IBM and bsmith (as identifier), and those two identities can be related, (b) an organization identity (e.g., SWGOrg) has its employees (person identities), (c) a group identity, USTennisTeam, is related to its constituent players (d) person identity bsmith is related to a device identity cell-phone sim#1234, and so forth. An identity can take on zero or more roles. The scope of a given role is relevant to the appropriate context. By taking on a role, an identity may include additional attributes. e.g., PCP has <patientList, specialty>. A financialAdvisor role may have <certificationLevel, adviseeList>, etc. Such attributes that are specific to a role are typically given values (e.g., specialty is 'cardiologist') when the role is assigned to an identity and, thus, the values of those role specific attributes are specific to a given identity. Attributes may also be independent of role, e.g., "location=NewYork," which in a given use case might apply that users in a primary care physician (PCP) role and in New York would have the privilege to treat patients in that State.

Identity Context-Based Access Control

With the above as background, the subject matter of this disclosure is now described.

As will be seen, the access control technique of this disclosure involves an "identity" and a "context" that together comprises an "identity context."

The solution uses the identity data for an organization. In this approach, that identity data is mined to generate one or more identity context(s) from the attributes of the user(s). Each identity context is expressed in an identity context expression, as will be seen. Preferably, only those attributes of the identity data that can have common or shared values across users (e.g., location, designation, and the like) are considered during the mining process, as opposed to attributes (e.g., names, e-mail, and the like) whose values are unique to a particular user (in other words, are not common or shared). After receiving the identity data and determining the attributes that will be used, one or more permutations or combinations of attributes are generated. Each such permutation or combination results in a cluster, which may then be identified as an identity context and expressed in an identity context expression. This identity data mining process can be seen by example.

Figures 4, 5, 6, 7:
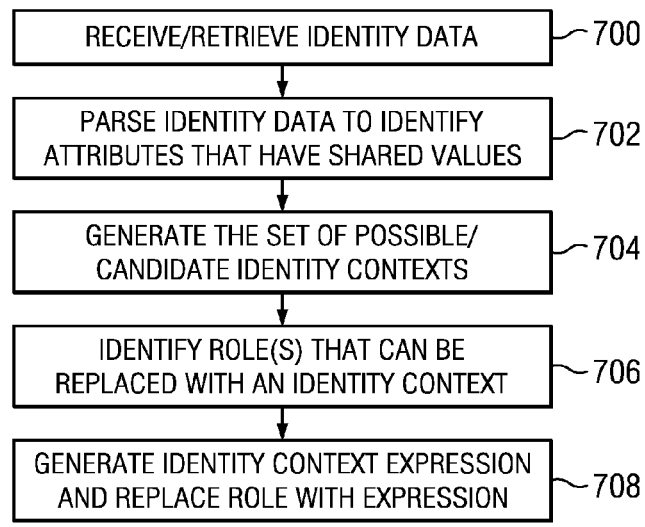
FIG. 4 illustrates sample identity data from an organization describing the users and the attributes.
FIG. 5 illustrates a set of possibly unique identity contexts that are generated from the information in FIG. 4.
FIG. 6 identifies the identity contexts of FIG. 5 that may be substituted for one or more roles in the RBAC system according to the teachings of this disclosure.
FIG. 7 is a process flow of the identity context-based access control method of this disclosure.

In particular, and with reference to FIG. 4, assume that organization has a number of users $u_n$ each of which has an associated set of identity data attributes $a_n$ of the type(s) described above (namely, those that can be shared across users). In this example scenario there are seven (7) users, and the identity data includes values for the attributes specified in the table. Thus, user $u_1$ has attributes $a_1$, $a_2$, and $a_5$, user $u_2$ has attributes $a_1$ and $a_2$, and so forth. Using this starting set of identity data, a set of possible identity contexts are generated, starting with the individual attributes, and then by evaluating permutations or combinations of attributes. FIG. 5 illustrates the possible sets of attributes or "clusters" that are candidates for the unique identity context(s). A first possible identity context A1 is derived for attribute $a_1$ by identifying each user that has that attribute: A1→$\{u_1, u_2, u_3, u_4, u_5\}$, is derived. In like manner, possible identity context(s) for each of the other represented attributes $a_2$, $a_3$, $a_4$ and $a_5$ are generated. After the individual attributes are processed, combinations or permutations of the attributes are then processed to create additional possible identity contexts. Thus, for example, the users that share attributes $a_2$ and $a_4$ give rise to possible identity context A2, A4→{$u_6$, $u_7$}. The users that share attributes $a_1$, $a_2$, and $a_5$ give rise to possible identity context A1, A2, A5→{$u_1$, $u_3$}. FIG. 5 illustrates the complete list of possible identity context(s) for the set of users and their associated attributes (from the identity data in FIG. 4).

Preferably, once the possible identity contexts are generated or determined in this manner, the roles and role memberships (e.g., as identified by a role mining algorithm or otherwise) are evaluated to determine if any of the roles can be replaced by an identity context, thereby reducing the proliferation of roles in the RBAC system. Thus, continuing with the above example, assume role R1 was identified by an existing role mining algorithm and that the membership of this role R1 is granted to user $u_6$ and $u_7$. According to this disclosure, the possible identity contexts in FIG. 5 are then examined to determine if any of them correspond to the role (i.e., if there is a unique combination of attributes that can identity these users). In this case, the answer is yes, as each of the following identity contexts correspond to the role membership set {$u_6$, $u_7$}: (A3), (A4), (A2, A3), (A2, A4), (A3, A4), and (A2, A3, A4). This solution set is shown in FIG. 6. Using these results, the role R1 is then placed with an identity context expression that represents the union (logical AND) of each of the attributes from all of the identified contexts. The resulting identity context expression is as follows: (A2&A3&A4). Now, the identity context expressed by this expression is used in the role-based access control to define the access control policy against which run-time queries are applied to determine whether access to a resource is permitted.

Generalizing, FIG. 7 is a process flow representing the technique of this disclosure, which may be implemented as software executed by a processor. The routine starts at step 700 to receive (or retrieve) the identity data. At step 702, the identity data is parsed to identify attributes that have shared or common values. The routine then continues at step 704 to generate the set of possible identity contexts. At step 706, one or more roles that may be replaced with an identity context are identified. At step 708, each role that may be replaced with an identity context is replaced with an identity context expression generated in the manner described above. The routine then continues by applying the identity context-based access control in response to a request. This completes the process.

Thus, according to the disclosure, one or more roles defined in a role-based access control method are replaced with an identity context expression. The identity context expressions are used inside access control policies to determine at run-time if a user should be granted access to a resource, which may be a system, machine, device, program, process or data.

As a concrete example, in a role-based access control, assume that the policy is that all nurses in Pune can access records of patients admitted to the hospital in Pune, while all nurses in Bangalore can access records of patients admitted to the hospital in Bangalore. In role-based access control, there would be three (3) roles defined: nurse, Pune nurse, and Bangalore nurse. Using the above-described technique for generating and applying an identity context, there would be one role nurse but the other roles would be replaced with an identity context expression such as location=Pune or location=Bangalore. This approach reduces the roles in an organization and thus reduces overhead.

The subject matter described herein has significant advantages over the prior art. The approach enhances an RBAC system by reducing the number of roles in an organization, thus reducing overhead associated with role governance. The approach simplifies the defining of access control policies in an organization, and it enables the access control system to scale efficiently even as the number of users and applications grows. The techniques here provide for more precise and fine-grained access control over prior art schemes as well. By replacing roles with one or more identity context expressions in the manner described, role-based access control significantly reduces role proliferation and increases efficiency and access control response. Access control is more manageable and efficient as a result.

The identity context(s) are readily determined by identifying clusters of users based on their unique combination(s) of attributes. By identifying unique combinations of attributes for all of the users in a role further differentiates the cluster of users from the rest of the user community. As noted, according to this disclosure this unique combination of attributes is used to define the identity context that is then used to replace the role.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. The PIM system or components thereof may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the authentication module components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, the authentication functionality provided herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "client-side" application should be broadly construed to refer to an application, a page associated with that application, or some other resource or function invoked by a client-side request to the application. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The techniques herein may be implemented in other types of access control systems besides RBAC. Thus, for example, the identity context-driven approach described herein may be applied to user-based access control, attribute-based access control, discretionary access control (DAC), mandatory access control (MAC), other life cycle management schemes, and the like.

Having described our invention, what we now claim is as follows.

The invention claimed is:

1. An access control method, comprising:
generating at least one identity context by identifying combinations of a set of attributes common to a cluster of users;
replacing at least one role in an access policy with an expression associated with the at least one identity context to generate an identity context-based access policy; and
in response to an access request, applying the identity-based access policy to control access to a resource;
wherein at least one of the generating, replacing and applying steps are carried out in software executing in a hardware element.

2. The access control method as described in claim 1 wherein the set of attributes are identity attributes.

3. The access control method as described in claim 1 wherein the set of attributes correspond only to attributes that have common values across the cluster of users and not attributes that have values unique to a particular user in the cluster of users.

4. The access control method as described in claim 1 wherein the at least one role in the access policy is replaced with the expression if the identity context defines the cluster of users that have been determined to be assigned to the role.

5. The access control method as described in claim 1 wherein the at least one identity context represents an intersection of attribute sets of each user in the cluster.

6. The access control method as described in claim 1 wherein the expression is determined by identifying a set of attributes that is common across the cluster of users but is not a subset of an attribute set that is common across other users in a community of users that includes the cluster of users.

7. The access control method as described in claim 1 wherein the at least one identity context is associated with a set of possible identity contexts derived from the set of attributes.

8. Apparatus, comprising:
a processor;
computer memory holding computer program instructions that when executed by the processor perform a method of access control, the method comprising:
generating at least one identity context by identifying combinations of a set of attributes common to a cluster of users;
replacing at least one role in an access policy with an expression associated with the at least one identity context to generate an identity context-based access policy; and
in response to an access request, applying the identity-based access policy to control access to a resource.

9. The apparatus as described in claim 8 wherein the set of attributes are identity attributes.

10. The apparatus as described in claim 8 wherein the set of attributes correspond only to attributes that have common values across the cluster of users and not attributes that have values unique to a particular user in the cluster of users.

11. The apparatus as described in claim 8 wherein the at least one role in the access policy is replaced with the expression if the identity context defines the cluster of users that have been determined to be assigned to the role.

12. The apparatus as described in claim 8 wherein the at least one identity context represents an intersection of attribute sets of each user in the cluster.

13. The apparatus as described in claim 8 wherein the expression is determined by identifying a set of attributes that is common across the cluster of users but is not a subset of an attribute set that is common across other users in a community of users that includes the cluster of users.

14. The apparatus as described in claim 8 wherein the at least one identity context is associated with a set of possible identity contexts derived from the set of attributes.

15. A computer program product in a non-transitory computer readable medium for use in a data processing system, the computer program product holding computer program instructions which, when executed by the data processing system, perform a method of access control, the method comprising:

generating at least one identity context by identifying combinations of a set of attributes common to a cluster of users;
   replacing at least one role in an access policy with an expression associated with the at least one identity context to generate an identity context-based access policy; and
   in response to an access request, applying the identity-based access policy to control access to a resource.

16. The computer program product as described in claim 15 wherein the set of attributes are identity attributes.

17. The computer program product as described in claim 15 wherein the set of attributes correspond only to attributes that have common values across the cluster of users and not attributes that have values unique to a particular user in the cluster of users.

18. The computer program product as described in claim 15 wherein the at least one role in the access policy is replaced with the expression if the identity context defines the cluster of users that have been determined to be assigned to the role.

19. The computer program product as described in claim 15 wherein the at least one identity context represents an intersection of attribute sets of each user in the cluster.

20. The computer program product as described in claim 15 wherein the expression is determined by identifying a set of attributes that is common across the cluster of users but is not a subset of an attribute set that is common across other users in a community of users that includes the cluster of users.

21. The computer program product as described in claim 15 wherein the at least one identity context is associated with a set of possible identity contexts derived from the set of attributes.

22. Apparatus, comprising:
   a processor;
   computer memory holding computer program instructions executed by the processor to perform a role-based access control method for a community of users, the method comprising:
      replacing a role in a role-based access control policy with an identity context expression representing a cluster of users that have been determined to be assigned to the role, the identity context expression having been determined by identifying a set of attributes that is common across the cluster of users but is not a subset of an attribute set that is common across other users in the community of users; and
      applying the access control policy to determine whether access to a resource is permitted.

* * * * *